(12) United States Patent
Meyer et al.

(10) Patent No.: US 9,010,783 B2
(45) Date of Patent: Apr. 21, 2015

(54) BALL JOINT AND CONTROL ARM FOR A MOTOR VEHICLE

(71) Applicant: Benteler Automobiltechnik GmbH, Paderborn (DE)

(72) Inventors: Stephan Meyer, Bielefeld (DE); Andreas Will, Beverungen (DE)

(73) Assignee: Benteler Automobiltechnik GmbH, Paderborn (DE)

(*) Notice: Subject to any disclaimer, the term of this patent is extended or adjusted under 35 U.S.C. 154(b) by 0 days.

(21) Appl. No.: 14/277,980

(22) Filed: May 15, 2014

(65) Prior Publication Data
US 2014/0339785 A1   Nov. 20, 2014

(30) Foreign Application Priority Data
May 17, 2013  (DE) .......................... 10 2013 105 091

(51) Int. Cl.
*B60G 7/00*  (2006.01)
*F16C 11/06*  (2006.01)

(52) U.S. Cl.
CPC ............ *B60G 7/005* (2013.01); *F16C 11/0623* (2013.01); *F16C 11/0685* (2013.01); *B60G 2204/416* (2013.01); *B60G 2206/16* (2013.01); *B60G 2206/8201* (2013.01)

(58) Field of Classification Search
CPC ............................ B60G 7/005; B60G 2204/416
USPC ................... 403/132, 133, 135, 270, 271; 280/93.511, 93.512, 124.134
See application file for complete search history.

(56) References Cited

U.S. PATENT DOCUMENTS

| | | | | |
|---|---|---|---|---|
| 5,152,628 A * | 10/1992 | Broszat et al. | ................ | 403/140 |
| 5,611,635 A * | 3/1997 | Schutt et al. | ................ | 403/141 |
| 5,921,698 A | 7/1999 | Hegen et al. | | |
| 7,331,733 B2 * | 2/2008 | Wolf et al. | ................ | 403/135 |
| 7,367,743 B2 | 5/2008 | Bernhardt et al. | | |
| 8,256,980 B2 | 9/2012 | Walter et al. | | |
| 2011/0170944 A1 | 7/2011 | Oellers | | |
| 2012/0141192 A1 * | 6/2012 | Kwon | ................ | 403/135 |

FOREIGN PATENT DOCUMENTS

| | | |
|---|---|---|
| DE | 42 24 895 | 2/1994 |
| DE | 195 23 674 | 1/1997 |
| DE | 197 56 984 | 7/1999 |
| DE | 102 12 791 | 10/2003 |
| DE | 203 11 595 | 2/2004 |
| DE | 102004040403 | 3/2006 |
| DE | 102006008252 | 8/2007 |
| DE | 10 2008 043 694 | 2/2012 |
| DE | 102013108080 | 2/2014 |
| DE | 10 2006 024198 | 12/2014 |
| EP | 0 481 212 | 4/1992 |
| FR | 2 691 490 | 11/1993 |
| JP | H06-156032 | 6/1994 |

* cited by examiner

*Primary Examiner* — Ruth Ilan
(74) *Attorney, Agent, or Firm* — Henry M. Feiereisen LLC

(57) ABSTRACT

A ball joint includes a base body, a ball socket formed in the base body, and a ball pivot having a joint ball which is received in the ball socket. The joint ball is held in the ball socket by a locking ring which has a flange portion bearing upon the base body. The flange portion has an outer periphery formed with a circumferential groove, with a groove flank of the groove providing a welding area. A welding seam running about the flange portion connects the locking ring to the base body.

20 Claims, 3 Drawing Sheets

BALL JOINT AND CONTROL ARM FOR A MOTOR VEHICLE

CROSS-REFERENCES TO RELATED APPLICATIONS

This application claims the priority of German Patent Application, Serial No, 10 2013 105 091.3, filed May 17, 2013, pursuant to 35 U.S.C. 119(a)-(d), the disclosure of which is incorporated herein by reference in its entirety as if fully set forth herein.

BACKGROUND OF THE INVENTION

The present invention relates to a ball joint and to a control arm for a motor vehicle provided with such a ball joint.

The following discussion of related art is provided to assist the reader in understanding the advantages of the invention, and is not to be construed as an admission that this related art is prior art to this invention.

Motor vehicle control arms, such as transverse members or side rails, are part of the wheel suspension of a motor vehicle and provided to control and steer the wheels and to absorb longitudinal and/or transverse forces. The kinematic linkage of the control arm is implemented via bearings or bearing assemblies. Ball joints find hereby application to enable the connection of the control arms with other components or the chassis with several rotational degrees of freedom.

It would be desirable and advantageous to obviate prior art shortcomings.

SUMMARY OF THE INVENTION

According to one aspect of the present invention, a ball joint includes a base body, a ball socket formed in the base body, a ball pivot having a joint ball which is received in the ball socket, a locking ring configured to hold the joint ball in the ball socket and having a flange portion bearing upon the base body, the flange portion having an outer periphery formed with a circumferential groove, with a groove flank of the groove providing a welding area, and a welding seam running about the flange portion for connecting the locking ring to the base body.

According to another advantageous feature of the present invention, the base body can be made, e.g. as pressed part, from a sheet metal blank, e.g. of a steel material such as high strength steel. Currently preferred is the use of a high strength multiphase steel with a tensile strength of 800 MPa and a yield point of 680 MPa or higher. The ball socket may be formed in one piece with the base body and can have a receptacle on an opening side of the ball socket for receiving the locking ring. The receptacle can be produced during shaping of the base body in a forming process, e.g. a deep-drawing process or pressing process.

According to another advantageous feature of the present invention, the joint ball of the ball pivot can be received in the ball socket through intervention of a bearing cup. The bearing cup can be made of thermoplastic material, e.g. polyoxymethylene (POM). The bearing cup may also be made of polyether ether ketone (PEEK). The locking ring is hereby used to maintain and positionally secure the joint ball in the ball socket. The locking ring can have a through opening through which a pivot body of the ball joint is guided. The locking ring mounted to the base body forms an upper closure of the ball joint.

The flange portion of the locking ring bears upon the base body in a proximate area of the opening of the ball socket. The attachment of the locking ring upon the base body is realized by a welding process, e.g. laser welding or electron beam welding.

According to another advantageous feature of the present invention, the groove may have a concave configuration on the outer periphery of the flange portion. During welding, the welding beam is directed onto the welding area. The clearing on the outside of the locking ring as a result of the presence of the groove enables a targeted alignment of the welding beam onto the welding area. The welding area broadens the impact zone of the welding beam. In this way, component tolerances or adverse effects can be compensated by the motion of the welding beam. A firm connection is ensured so long as the welding beam strikes the welding area. A circumferential welding seam is created in the contact zone between the locking ring and the base body below the contact zone and extends in the plane of the contact zone.

A ball joint according to the present invention is beneficial in terms of manufacture and is highly stress-resistant. The novel design improves quality of the ball joint with respect to strength and stress resistance as well as service life. The ball joint, in particular the connection between base body and locking ring, can be manufactured effectively and at shorter production time. An expanded tolerance range in particular is provided because the joint between base body and locking ring in accordance with the present invention is of high quality, even in the presence of fluctuating component tolerances.

According to another advantageous feature of the present invention, the welding area may be bound by a nose-shaped or wedge-shaped welding zone. The groove may hereby be configured in such a way that the welding beam is incident on the welding area at a predefined angle. Advantageously, the groove flank can be configured to have a lower groove flank, which can form the welding area, and an upper groove flank. The upper groove flank extends hereby at an angle of greater than or equal to 10° in relation to a vertical. Currently preferred is an angle of greater than or equal to 20° in relation to the vertical.

The groove is configured such that the welding beam can be guided relatively steep. Advantageously, the welding beam can be inclined at an angle of less than 20° in relation to the vertical or central longitudinal axis of the ball joint.

As a result of the novel configuration of the locking ring with the welding area on the outer circumference thereof, the connection zone in the contact zone between the base body and the bottom side of the locking ring or flange portion is widened or increased. A broad welding zone increases tensile strength and compressive resistance of the connection so that an increased pushing force of the ball pivot is realized.

According to another advantageous feature of the present invention, the locking ring can have a neck portion defined by an outer diameter, wherein the flange portion has an outer diameter which is greater than the outer diameter of the neck portion. The flange portion can bear upon the base body with an annular region situated below the flange portion.

The ball pivot can be secured in the ball socket by inserting the locking ring with its neck portion in the receptacle. The neck portion engages in the receptacle and urges hereby an upper circumferential wall section of the bearing cup against the joint ball. For this purpose, the neck portion has an inner circumferential surface of a shape which complements the geometry of the joint ball. The locking ring bears upon the base body via an annular surface at the bottom side of the flange portion. Joining is realized by the afore-described welding process using a welding beam which impinges from outside upon the welding area. The welding area, upon which the welding beam is directed and acts, and the created connection zone are sized sufficient to reliably compensate component tolerances or inaccuracies during motion of the welding beam, without adversely affecting the quality of the welded joint.

According to another advantageous feature of the present invention, a sealing bellows may be provided for protection of the ball joint. The sealing bellows may be made of rubber-elastic material, such as an elastomer, e.g. a CR elastomer (chloroprene rubber elastomer). A first clamping element can secure the sealing bellows on an outside of the flange portion at a clamping zone formed above the groove on the flange portion. The size of the clamping zone above the groove is sufficient to enable a reliable clamping of the sealing bellows by the clamping element. In addition, a second clamping element can be provided to secure the sealing bellows on a pivot body of the ball pivot. Examples of clamping elements include in particular clamping rings made of spring steel wire.

According to another aspect of the present invention, a control arm for a motor vehicle includes a ball joint which includes a base body, a ball socket formed in the base body, a ball pivot having a joint ball which is received in the ball socket, a locking ring configured to hold the joint ball in the ball socket and having a flange portion bearing upon the base body, said flange portion having an outer periphery formed with a circumferential groove and a groove flank to provide a welding area, and a welding seam running about the flange portion for connecting the locking ring to the base body.

The present invention thus enables an efficient production of lightweight control arms for motor vehicles, in particular transverse members or side rails. The ball socket can be made in one piece with the base body of the control arm and is formed as the base body is shaped from the sheet metal blank. The ball socket forms a single-part housing receptacle in the base body for receiving the joint ball of the pivot body. As the locking ring is circumferentially joined to the base body in a stable manner, the pivot body is held in the ball socket to enable a rotational motion or sliding motion. The novel design creates a connection between the locking ring and the base body which can be subjected to high stress and reliably absorbs tensile, compressive and shear forces during operation.

According to another advantageous feature of the present invention, the base body has a joining zone which is formed around the opening of the ball socket and upon which the flange portion of the locking ring rests via the annular surface on the bottom side of the flange portion. The joining zone is formed as the base body is shaped, and the joining zone may be configured to project in the direction of the locking ring in relation to the plane of the adjacent bottom region of the base body. Thus, the joining process can be further improved between the locking ring and the base body.

Bending and torsional resistances of a motor vehicle control arm can be further improved by using a ball joint according to the invention, when the base body has a cup-shaped configuration and includes a bottom with border-side legs. The bottom may further have stiffness-increasing depressions or eyelets with circumferentially closed or breached collars. The presence of such eyelets provide increase in stiffness and saves weight.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4b is a still further enlarged detailed view of the area A in FIG. 4a; and

DETAILED DESCRIPTION OF PREFERRED EMBODIMENTS

Figure 1:
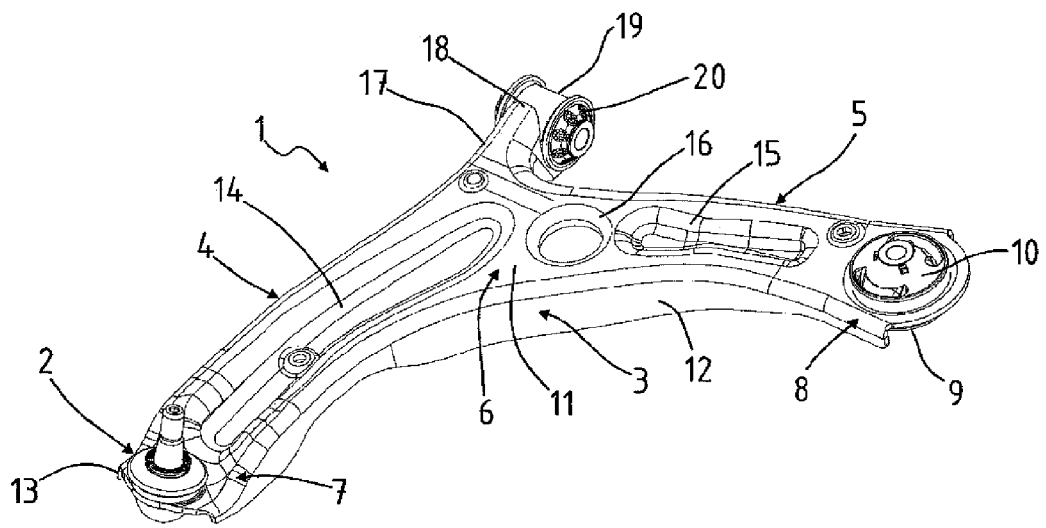
FIG. 1 is a top and side perspective view of a transverse member with integrated ball joint according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a top and side perspective view of a motor vehicle control arm in the form of a transverse member, generally designated by reference numeral 1 and having integrated therein a ball joint according to the present invention, generally designated by reference numeral 2. The transverse member 1 may find application within the wheel control or wheel suspension of the motor vehicle.

The transverse member 1 includes a base body 3 which has a cup-shaped configuration and can be made of steel, e.g. produced from a steel sheet blank using a pressforming process. The base body 3 has two length portions 4, 5 which are aligned transversely to one another at an angle. A connection zone 6 forms a transition between the length portions 4, 5. The base body 3 is produced from a steel sheet blank through pressforming. The ball joint 2 is arranged at a free end 7 of the length portion 4 in the end zone thereof. A bearing mount in the form of an eyelet 9 is provided at a free end 8 of the length portion 5 in the end zone thereof for accommodating a rubber-metal bearing 10.

The base body 3 has a bottom 11 with border-side legs 12, 13. The legs 12, 13 are arranged at a right angle in relation to the bottom 11. The bottom 11 of the base body 3 is formed with depressions 14, 15 in the length portions 4 and 5, respectively. The depressions 14, 15 project out in the direction of the border-side legs 12, 13, respectively. Furthermore, the bottom 11 has an eyelet 16 which is formed in the connection zone 6 between the depressions 14, 15 and points in the direction of the depressions 14, 15. A protrusion 17 extends from the outer periphery of the connection zone 6 to form a bearing mount 18 at a free end thereof. A sleeve 19 is joined here for a rubber-metal bearing 20.

Figure 2:
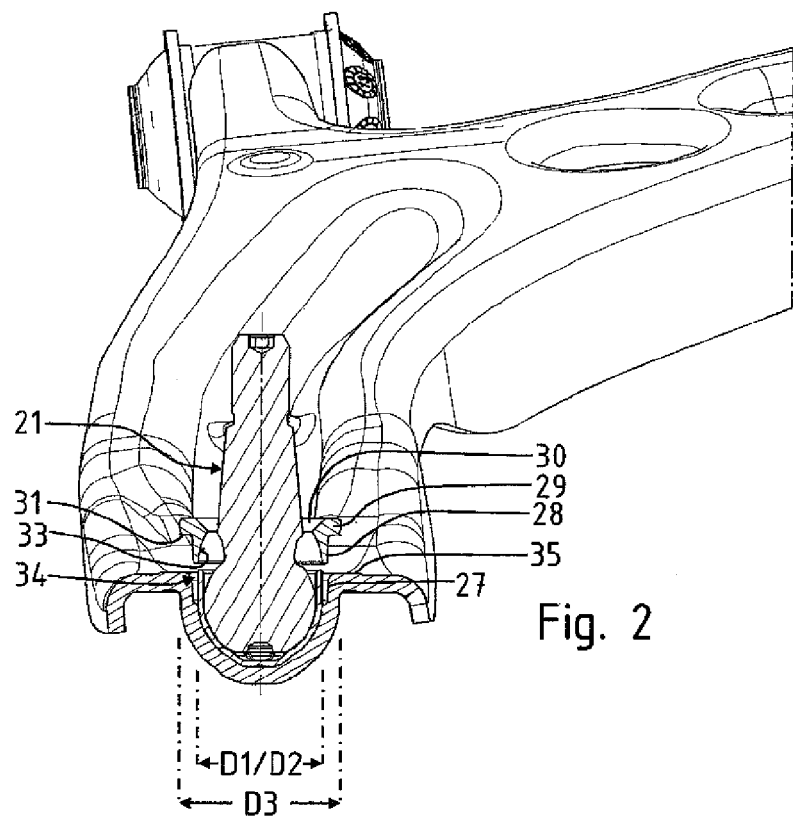
FIG. 2 is a vertical section through the transverse member in the area of the ball joint, depicting a first assembly situation of the ball joint.
Figure 3:
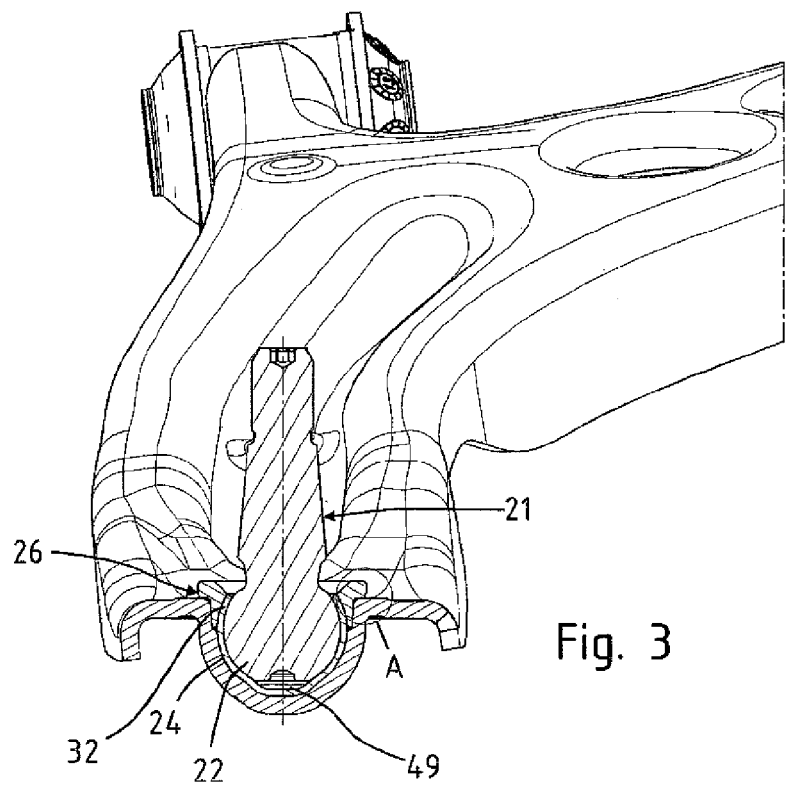
FIG. 3 is a vertical section through the transverse member in the area of the ball joint, depicting a second assembly situation of the ball joint.

FIGS. 2 and 3 show vertical sections through the transverse member 1 in the area of the ball joint 2, depicting two assembly situations of the ball joint 2. The ball joint 2 includes a ball pivot 21 having a joint ball 22 and a pivot body 23. The joint ball 22 of the ball pivot 21 is received in a ball socket 26 through intervention of a bearing cup 24 and aligned by a locking ring 26. The locking ring 26 involved here is a turned part. The bearing cup 24 is made of thermoplastic material.

The ball socket 25 is formed in one piece with the base body 3 and formed from the sheet metal blank as the base body 3 is produced by pressforming. Arranged at the side of the opening of the ball socket 25 is a receptacle 27 for the locking ring 26. The locking ring 26 has a neck portion 28 and a flange portion 29. The locking ring 26 has furthermore a central opening 30 for passage of the pivot body 23. The neck portion 28 of the locking ring 26 is defined by an outer diameter D1 which corresponds to an inner diameter D2 of the receptacle 27 for the locking ring 26. The flange portion 29 of the locking ring 26 is defined by an outer diameter D3 which is greater than the outer diameter D1 of the neck portion 28. An annular surface 31 is formed at the underside of the flange portion on a side of the base body 3.

When the ball joint 2 is assembled, the bearing cup 24, greased beforehand on the inside, is placed into the ball socket 25. The ball pivot 21 is positioned with its joint ball 22 in the bearing cup 24, and the locking ring 26 is then guided with its opening 30 over the pivot body 23 and placed and press-fitted with the neck portion 28 into the locking ring receptacle 27. As a result, an upper circumferential wall section 32 of the bearing cup 24 is pressed by the inner contour of the locking ring 26 against the joint ball 22 so that the bearing cup 24 conforms to the ball shape of the joint ball 22. For that purpose, the locking ring 26 has at its inner circumference an inner wall 33 which has a spherical configuration which complements the shape of the joint ball 22.

FIG. 2 shows the ball pivot 21 in the bearing cup 24 before mounting the locking ring 26, whereas FIG. 3 shows the assembly situation in which the locking ring 26 has been press-fitted into place. The locking ring 26, positioned in the receptacle 27, rests with its annular surface 31 upon a joining zone 35 which is formed circumferentially about the opening 34 of the ball socket 25. The joining zone 35 is formed as the base body 3 is shaped and slightly projects by a measure a in relation to the plane of the adjacent bottom region 36 of the base body 3 in the direction of the annular surface 31, as shown in particular in FIG. 4a. The joining zone 35 is realized by material displacement during the pressing process of the base body 3.

The locking ring 26 is welded to the base body 3 by laser beam welding or electron beam welding. The locking ring 26 and the base body 3 are hereby connected to one another by a circumferential welding seam 37 which extends along the annular surface 31 on the underside of the flange portion 29 and the joining zone 35 of the base body 3.

Figure 4A:
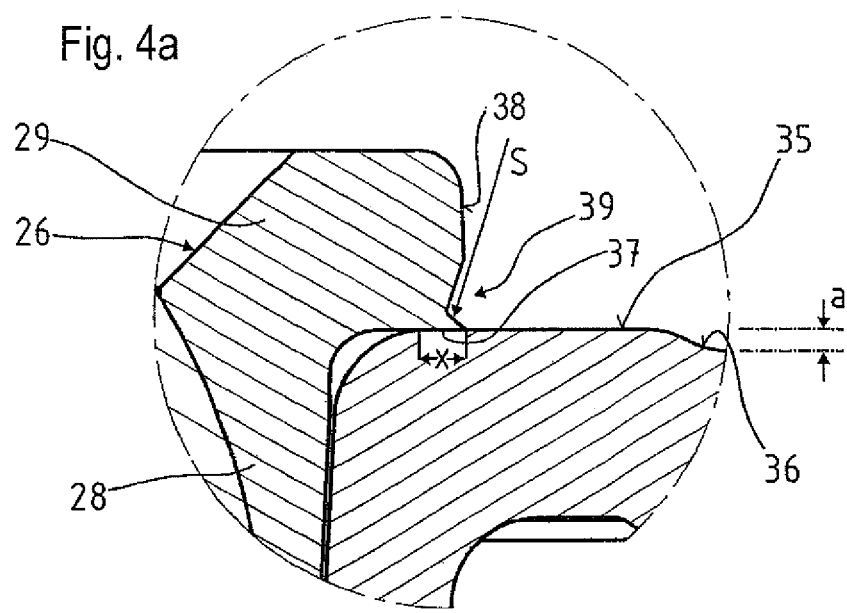
FIG. 4a is an enlarged detailed view of the area encircled in FIG. 3 and marked A.
Figure 4B:
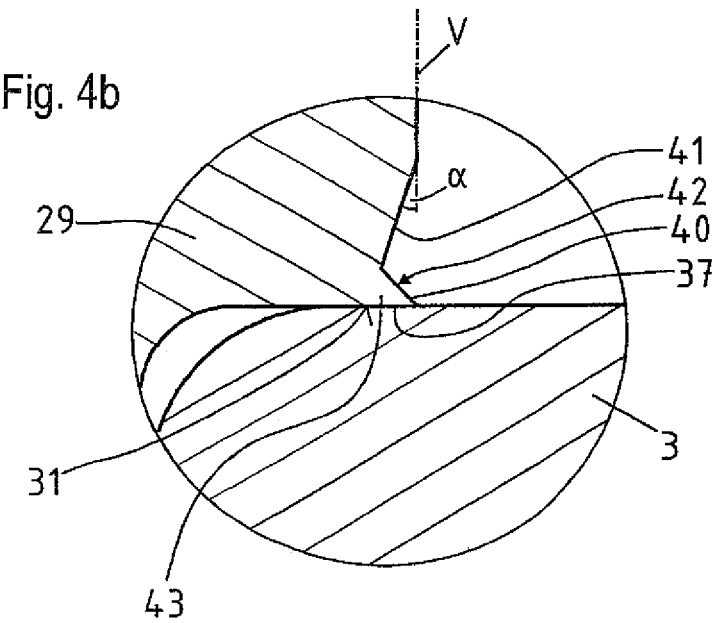

The flange portion 29 has an outer periphery 38 provided with a circumferential groove 39, as shown in FIGS. 4a and 4b. The groove 39 has a lower groove flank 40 and an upper groove flank 41. The lower groove flank 40 is configured as welding area 42. A welding beam S is directed upon the welding area 42 during the joining process. The groove 39 is hereby configured such that the welding beam S is reliably incident on the welding area 42, even when component tolerances of the locking ring 26 and/or base body 3 cause inaccuracies in assembly and position. Also, unevenness in the welding motion has no adverse effect because the welding area 42 is sized sufficiently large as target zone for the welding beam S. A nose-shaped or wedge-shaped welding zone 43 is provided below the welding area 42 and is bounded upwards by the welding area 42. The underside of the welding zone 43 is formed by the annular surface 31. A firm and high-quality welding seam 37 is realized as long as the welding beam S impacts the welding area 42. The joined connection is formed in the contact zone between the locking ring 26 and the base body 3 at the annular surface 31 and the joining zone 35 in the form of the circumferential welding seam 37 which extends in the plane of the contact zone. The presence of the welding area 42, which extends at an angle to the plane of the contact zone, enlarges the joining zone or connection zone. The width of the connection zone is designated in FIG. 4a by reference sign x. The width x of the connection zone is enlarged compared to conventional joining. This greater material coverage at the connection site results in an increase in strength of the connection. This results advantageously also in an increase of the pushing force against the ball pivot 21.

The welding beam S may be guided steeply in relation to the vertical V. Welding angles between 0° and 20° are possible. The geometry of the groove 39 is configured such that the welding beam S impacts the welding area 42. The groove 39 may be concavely shaped. The upper groove flank 41 extends in relation to the vertical V at an angle α which is greater than or equal to 10°. Currently preferred is an angle α of greater than or equal to 20°. In this way, the clearance on the outer circumference 38 of the flange portion 29 by the groove 39 can be suited to the welding beam position and the welding motion. The upper groove flank 41 and the lower groove flank 40 meet in the groove base at an obtuse angle.

Figure 5:
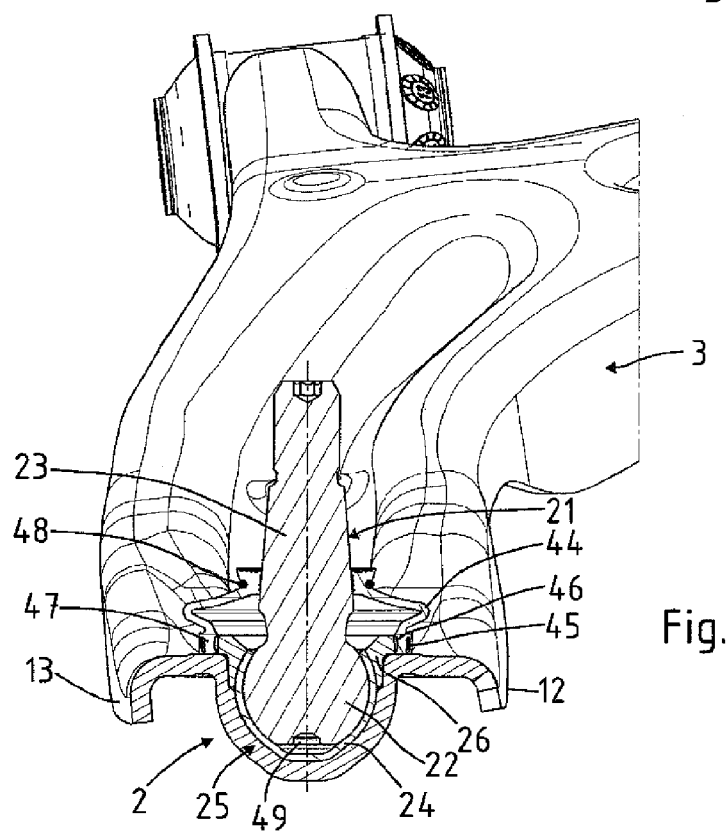
FIG. 5 is a vertical section through the transverse member in the area of the ball joint, depicting a final assembly situation of the ball joint.

The ball joint 2 and the joint ball 22, rotatably mounted in the ball socket 25, can be protected from environmental impacts by a sealing bellows 44, as shown in FIG. 5. The sealing bellows 44 is secured in place on the locking ring 26 by a first clamping element 45 on a clamping zone 46 above the groove 39 on the outer circumference 38 of the flange portion 29. The first clamping element 45 is integrated, e.g. vulcanized, in a lower annular collar 47 of the sealing bellows 44. Moreover, the sealing bellows 44 is secured by a second clamping element 48 on the pivot body 23. During assembly, the sealing bellows 44 is secured initially to the pivot body 23 by the upper second clamping element 48 in the form of a spring steel ring. Subsequently, the lower socket-proximal end of the sealing bellows 44 is secured by the lower first clamping element 45 to the outside on the locking ring 26. The clamping element 45 may advantageously cooperate with the groove 39 for securement.

FIGS. 2, 3, 5 further show that the joint ball 22 of the ball pivot 21 has an underside formed with recess 49. The recess 49 may be used as lubricant reservoir.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:
1. A ball joint, comprising:
a base body;
a ball socket formed in the base body;
a ball pivot having a joint ball which is received in the ball socket;

a locking ring configured to hold the joint ball in the ball socket and having a flange portion bearing upon the base body, said flange portion having an outer periphery formed with a circumferential groove, with a groove flank of the groove providing a welding area; and a welding seam running about the flange portion for connecting the locking ring to the base body.

2. The ball joint of claim 1, constructed for support of a component of a wheel suspension of a motor vehicle.

3. The ball joint of claim 2, wherein the component is a transverse member or a side rail.

4. The ball joint of claim 1, wherein the welding area bounds a nose-shaped or wedge-shaped welding zone.

5. The ball joint of claim 1, wherein the groove is configured to enable a welding beam to be incident on the welding area.

6. The ball joint of claim 1, wherein the groove has a concave configuration.

7. The ball joint of claim 1, wherein the groove flank is configured to have a lower groove flank and an upper groove flank, with the upper groove flank extending at an angle in relation to a vertical, said angle being greater than or equal to 10°.

8. The ball joint of claim 7, wherein the angle is greater than or equal to 20°.

9. The ball joint of claim 1, wherein the flange portion has a circumferential clamping zone above the groove.

10. The ball joint of claim 1, wherein the base body is made from a sheet metal blank, said ball socket being formed in one piece from the sheet metal blank and having a receptacle for receiving the locking ring in a proximate area of an opening of the ball socket, said locking ring having a neck portion defined by an outer diameter, wherein the flange portion has an outer diameter which is greater than the outer diameter of the neck portion.

11. The ball joint of claim 10, wherein the neck portion has an inner circumferential surface of a shape which complements a geometry of the joint ball.

12. The ball joint of claim 10, wherein the sheet metal blank is made of steel having a tensile strength of 800 MPa and a yield point of at least 680 MPa.

13. The ball joint of claim 10, wherein the neck portion of the locking ring is defined by an outer diameter which corresponds to an inner diameter of the receptacle.

14. The ball joint of claim 10, wherein the flange portion of the locking ring is defined by an outer diameter which is greater than an outer diameter of the neck portion of the locking ring.

15. The ball joint of claim 1, further comprising a bearing cup, said joint ball of the ball pivot being received in the ball socket through intervention of the bearing cup.

16. The ball joint of claim 15, wherein the bearing cup is made of thermoplastic material.

17. The ball joint of claim 1, further comprising a sealing bellows, a first clamping element configured to secure the sealing bellows on an outside of the flange portion, and a second clamping element configured to secure the sealing bellows on a pivot body of the ball pivot.

18. The ball joint of claim 17, wherein the sealing bellows is made of rubber-elastic material.

19. A control arm for a motor vehicle, comprising a ball joint which includes a base body, a ball socket formed in the base body, a ball pivot having a joint ball which is received in the ball socket, a locking ring configured to hold the joint ball in the ball socket and having a flange portion bearing upon the base body, said flange portion having an outer periphery formed with a circumferential groove, with a groove flank of the groove providing a welding area, and a welding seam running about the flange portion for connecting the locking ring to the base body.

20. The control arm of claim 19, wherein the base body has a cup-shaped configuration and includes a bottom with border-side legs.

* * * * *